Patented Dec. 27, 1927.

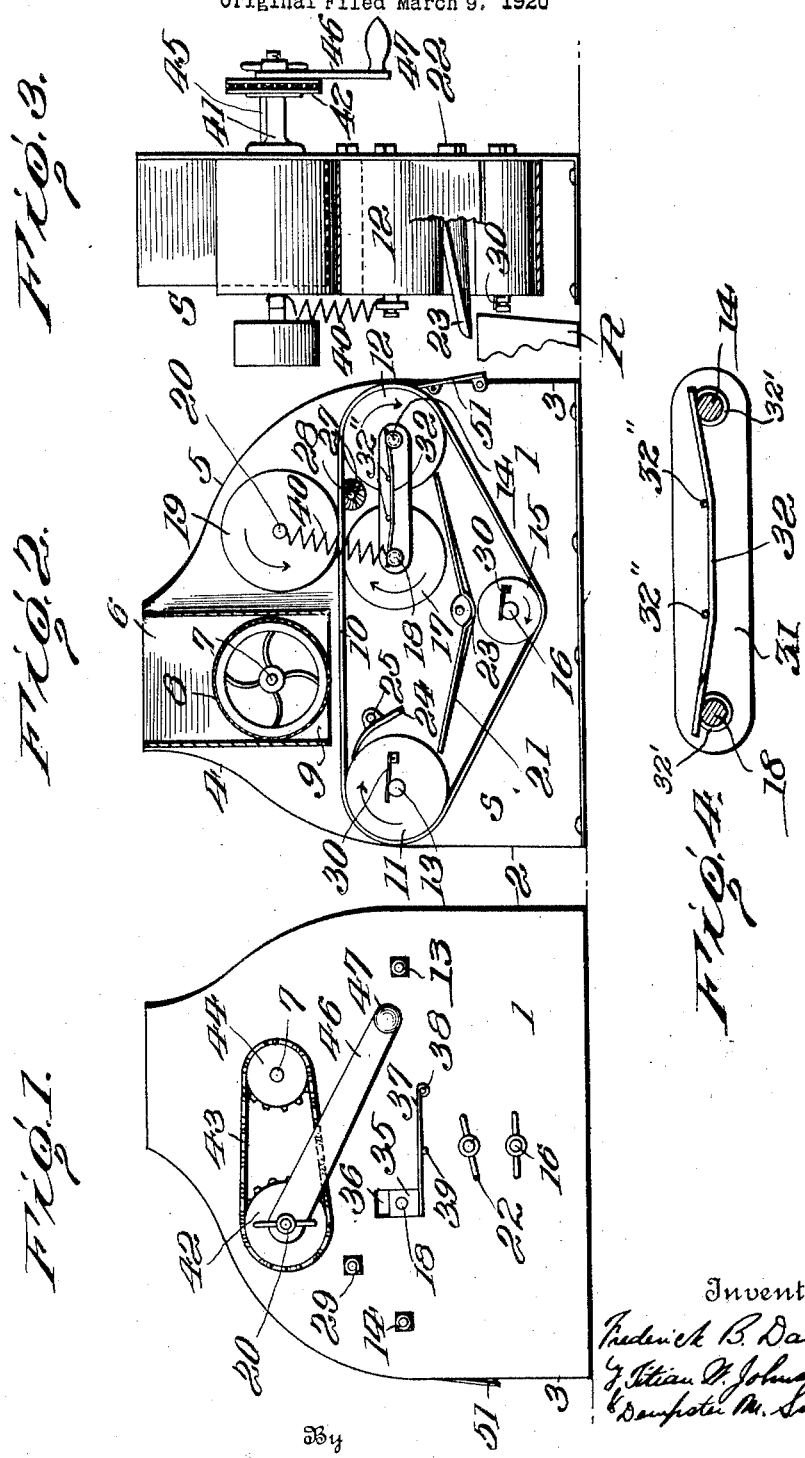

1,653,991

UNITED STATES PATENT OFFICE.

FREDERICK B. DAVIS, OF LINCOLN, VIRGINIA, ASSIGNOR TO NATIONAL FRUIT JUICE EXTRACTOR COMPANY, A CORPORATION OF DELAWARE.

FRUIT PRESS.

Application filed March 9, 1920, Serial No. 364,554. Renewed August 11, 1927.

This invention relates to improvements in cider presses.

The primary object of the invention is to provide a simple and comparatively inexpensive press which will be practical for domestic use.

I am aware that fruit presses have been made involving the use of travelling belts or conveyers in connection with rollers for pressing out the juice of the fruit, but these have usually been so expensive and complicated as to preclude their general adoption and use, and have embodied such constructions as make it difficult to clean the machine, a thing very necessary to be done where the machine handles fruits that give up more or less acids and syrups which have a tendency to corrode and destroy, or clog and gum the machinery.

To meet and obviate these difficulties and objections, I have devised a machine having in the first place, a peculiarly constructed frame which lends itself to the easy and convenient mounting of the operative parts of the device, which parts are so constructed and arranged that they can be readily removed from one open side of the machine for cleaning and replaced in their proper operative positions with little or no effort and in a very short time.

Referring to the drawings illustrating the invention,

Figure 1 is a side elevation of the machine showing the closed side;

Figure 2 is a reverse elevation showing the open side of the machine, the fruit box or hopper being in section;

Figure 3 is a front view of the machine, and

Figure 4 is an enlarged detail showing the means for locking two of the rolls in their shafts.

The frame of the machine consists of a side wall 1 and end walls 2 and 3 and these walls may converge towards the top as at 4 and 5 leaving an opening in which the grinder 6 is located. This arrangement of the frame constitutes therefor a housing having an open side S, from which all the working parts are accessible and the pressing process may be observed. Practically all of the working parts are supported by the side wall 1 of the enclosure.

The grinder comprises a housing 6' through which passes a shaft 7 on which the grinding wheel 8 of any suitable construction is placed. Fruit or other articles to be ground are inserted in the open top of the grinder and are ground between the grinding wheel 8 and one wall of the housing and fall through the open bottom 9 of the housing upon a conveyer or belt 10. This belt may be of any suitable permeable fabric. In the preferred construction it may be of wire mesh. The conveyer belt is carried by two main rollers 11, 12, located near the end walls of the casing, and these rolls are carried respectively on shafts 13, 14. The tension of the belt is maintained by roll 15 carried by a shaft 16 and located near the bottom of the housing. A lower pressing roll 17 is located near belt roll 12 below the belt and is carried by a shaft 18, and an upper pressing roll 19 is located nearly directly above roll 17 and is fixed to a shaft 20. The conveyer belt passes between rolls 17 and 19 and these rolls are urged together by suitable devices later described so that fruit pulp passing from the grinder toward the rolls is squeezed between them and the juice extracted. This juice runs down and is caught by a trough 21 secured at its back to wall 1 of the casing conveniently by a thumb nut 22. The trough has a spout 23 extending outward from the open side S of the casing to a convenient position for discharging juice into a suitable receptacle such as R, Fig. 3.

A guard 24 is placed above roll 11 in a position to deflect juice dropping directly from the grinder through the belt into trough 21. This guard is secured to wall 1 of the casing at 25, and the securing device may be a thumb nut in cases where it is desirable to make the guard readily detachable.

A rotary brush 27 is preferably provided, located between rolls 17 and 12 and arranged to engage the under surface of the conveyer belt. This brush is carried by a shaft 28 secured to wall 1 at 29.

It is desirable to make all of the rolls easily detachable from their shafts. This detachable connection, as in the case of rolls 11 and 15, may consist in a spring clip 30 connected to the roll and engaging a groove near the outer end of the shaft. When it is desired to remove the roll the spring clip may be moved up out of the groove and the roll pulled off of the shaft, and replaced in an obvious manner. Rolls 12 and 17 are secured to a flat link 31, which link is apertured to receive the ends of the respective shafts 14 and 18. The numeral 32 designates a spring clip, the ends of which fit in grooves 32' near the ends of the shafts 14 and 18, the clip being prevented from moving upwardly by short pins 32" supported in the link. With this construction when it is desired to remove the rolls, it is only necessary to lift the ends of the clip out of the grooves near the ends of the shafts when the clip may be removed laterally which will permit the removal of the link and free the ends of the shafts. The brush 28 and roll 19 may be secured by devices similar to those shown in connection with rolls 11 and 15.

It is necessary to provide for movement of one of the rolls 17, 19, toward the other to provide yielding pressure for extracting the juice from the fruit pulp. Preferably, for this purpose, shaft 18 of roll 17 is mounted in a sleeve bearing 35 and the end of this is located in a vertically elongated slot 36 in side plate 1. A spring 37, which may be a flat spring, bears against the lower side of the sleeve bearing. The spring is connected to the side plate at 38 and is tensioned by a pin 39. The outer or free end of shaft 18 may be connected to the outward end of shaft 20 by a helical contractile spring 40. The two springs therefore urge both ends of shaft 18 upward and provide the necessary yielding pressure between rolls 17 and 19.

Shaft 20 is provided with a sleeve bearing 41 fixed upon side plate 1. Beyond the bearing the shaft is provided with a sprocket wheel 42 and this is connected by belt or chain 43 with a sprocket wheel 44 on shaft 7. Shaft 7 is carried by a sleeve bearing 45 also fixed on side plate 1. A driving crank 46 may be connected to either shaft 7 or shaft 20. In this case it is shown connected to shaft 20 for driving the entire mechanism. The crank has a handle 47.

In some cases I provide the side wheel 3 with a scraper 51 which is arranged to bear against the conveyor belt to scrape from the belt, pulp from which the juice has been extracted.

The general operation is obvious from the previous description. The extraction of juice is very effective and rapid, and in addition the entire machine and its parts may be quickly and easily cleaned by manipulating the quickly detachable fastenings of the different rolls and removing the rolls with the conveyer belt, and when desired, also removing the trough 21 by loosening its thumb screw 22, and when cleaned the parts may be as readily replaced.

What I claim is:

In a fruit press or the like, the combination of a housing having an open side and a side wall, two conveyer belt rolls, a perforate conveyer belt passing over the rolls, a tension roller engaging the lower stretch of the belt and located considerably below the level of the other rolls, a lower pressure roll arranged between the two rolls first mentioned and beneath the upper stretch of the belt, an upper pressure roll located above the upper stretch of the belt, means for urging the pressure rolls together, a movable bearing for one of the pressure rolls located in the side wall of the housing, shafts for the other rolls, each shaft being connected at one end to said side wall, and means at the outer free ends of such shafts for securing their respective rolls detachably upon the shafts whereby the rolls and the conveyer belt may be quickly removed for cleaning.

In testimony whereof I affix my signature.

FREDERICK B. DAVIS.